United States Patent [19]

Harben, Jr., deceased

[11] Patent Number: 4,868,950
[45] Date of Patent: Sep. 26, 1989

[54] FOWL SCALDING APPARATUS AND METHOD

[75] Inventor: Grover S. Harben, Jr., deceased, late of Gainesville, Ga., by Grover S. Harben, III, executor

[73] Assignee: Centennial Machine Company, Inc., Gainesville, Ga.

[21] Appl. No.: 293,019

[22] Filed: Jan. 3, 1989

[51] Int. Cl.⁴ .............................. A22C 21/04
[52] U.S. Cl. ........................... 17/11.2; 17/51; 17/15; 17/64
[58] Field of Search ............... 17/11.2, 13–15, 17/47, 51, 64

[56] References Cited

U.S. PATENT DOCUMENTS

| | | | |
|---|---|---|---|
| 3,074,103 | 1/1963 | Roth | 17/45 |
| 3,343,477 | 9/1967 | Ekstam | 17/13 |
| 3,561,040 | 2/1971 | Floden | 17/11.2 |
| 3,631,563 | 1/1972 | Snowden | 17/51 |
| 3,657,768 | 4/1972 | Snowden | 17/11.2 |
| 3,703,021 | 11/1972 | Sharp | 17/47 |
| 3,716,892 | 2/1973 | Miles | 17/11 |
| 3,748,691 | 7/1973 | Snowden | 17/11.2 |

FOREIGN PATENT DOCUMENTS

| | | | |
|---|---|---|---|
| 688252 | 6/1964 | Canada | 17/11.2 |
| 721419 | 1/1955 | United Kingdom | 17/11.2 |

*Primary Examiner*—Willis Little
*Attorney, Agent, or Firm*—Jones, Askew & Lunsford

[57] ABSTRACT

Apparatus for scalding or chilling poultry carcasses or the like. Fans are positioned to recirculate a flow of air toward the path travelled by the birds, and droplets of heated or chilled water are introduced to the air stream. A flow of water advantageously is introduced immediately upstream of the fans, so that the fan blades atomize the water and direct the water droplets toward the carcasses.

14 Claims, 2 Drawing Sheets

FOWL SCALDING APPARATUS AND METHOD

FIELD OF INVENTION

This invention relates in general to processing poultry carcasses, and relates in particular to an apparatus and method for scalding the carcasses prior to defeathering.

BACKGROUND OF THE INVENTION

Domestic fowl such as chicken and turkeys usually are subjected to scalding before their feathers are removed. In the scalding process the carcasses of recently-killed fowl, hereinafter referred to as 'birds', are subjected to hot water which wets and loosens the feathers relative to the carcass. Subjecting the birds to hot water also helps remove grease and contamination from the exterior of the bird, which makes easier the subsequent defeathering or plucking of the bird.

The conventional approach to scalding birds in commercial poultry-processing operations is to immerse the recently-killed bird in a tank of hot water. This immersion takes place while the birds are suspended from shackles moving along a conventional overhead conveyor line. The line passes above a dip tank filled with water heated to the desired temperature, and the conveyor line moves downwardly to lower the birds into the water. The birds traverse the tank while immersed in the water, and then emerge from the tank as the conveyor line moves upward and carries the birds on to the picking machinery.

Because each bird can release fecal matter or other body fluids to the water while the bird is immersed in the dip tank, the water in the dip tank soon becomes highly contaminated with feathers, dirt, blood, and fecal matter from the birds. This unsanitary condition becomes increasingly bad as successive birds are dipped in the scalder. In practice, most poultry processing plants frequently drain the scalder tank, thereafter cleaning the scalder tank, refilling it with fresh water, and heating the fresh water to the desired scalding temperature, which can range from about 115° F. to about 140° F. depending on whether soft scalding or hard scalding is desired. The task of cleaning a dip-tank scalder is recognized as one of the most unpleasant tasks in a poultry processing plant. Moreover, the entire processing line must be shut down for the time taken to drain and clean the scalder, and then to heat the refilled water to the desired scalding temperature. This cleaning operation also is wasteful of energy through the need of periodically discarding the hot water in the tank.

The problems associated with the conventional dip-tank scalder have not gone unnoticed, and efforts to overcome the problem are known to the prior art. These attempted solutions, however, have not proven successful and thus have not found general acceptance in the industry. One such proposal is known as the steam scalder wherein the birds are subjected to an environment of steam or a steam-water mixture instead of dipping the birds in a tank. It has proven difficult to control the temperature to which each bird is subjected in a steam scalder, especially where only soft-scalding is desired. Applying excessive heat to the bird during the scalding operation can cause spotting or otherwise damage the skin, impairing the appearance and reducing the commercial value of the bird. Other proposed replacements for dip scalders employ nozzles positioned to spray hot water on the birds. The hot water used in any scalder must be recycled as a practical matter, due to the unacceptable cost otherwise associated with constantly heating fresh cold water instead of adding incremental heat to recirculating hot water. Because the recirculating water soon contains feathers and other particulate matter which tends to lodge in and clog the spray nozzles, the spray scalders of the prior art have experienced substantial downtime and have not found practical acceptance.

SUMMARY OF INVENTION

Stated in general terms, birds are scalded or chilled according to the present invention by directing a stream of air in a direction intersecting the path along which the birds travel. One or more fans mounted at a side of the travel path can provide the moving air stream. A flow of water maintained at a suitable nonambient temperature is introduced immediately behind the fans, so that the fans break up the water flow into small droplets and propel those droplets toward the birds at a relatively high velocity. The water droplets impinge the bird carcasses and either scald or chill the carcasses, depending on whether heated or chilled water is used. The water spray is collected and recirculated, after being reheated or rechilled to the appropriate operating temperature.

Stated in somewhat greater detail, the flow of water is introduced immediately behind the fan, at a relatively low velocity and at little or no outlet pressure so as not to require a nozzle or other constricted orifice of the kind likely to become clogged by the presence of feathers or other debris in the recirculating water. The water preferably flow onto a central portion of the fan, such as the hub from which the fan blades radiate. Rotation of the fans moves the water outwardly along the blades, where the water is fragmented into small droplets which enter the air stream blowing towards the birds. The fans preferably are mounted within an enclosure or are otherwise disposed so as to produce a recirculating flow of air and water droplets which intersect the path along which the bird carcasses are conveyed.

Accordingly, it is an object of the present invention to provide an improved apparatus and method for scalding or chilling animal carcasses.

It is another object of the present invention to provide an improved apparatus for scalding or chilling poultry carcasses or the like.

It is a further object of the present invention to provide a method and apparatus for scalding carcasses without immersing the carcasses in water.

It is a further object of the present invention to provide a method and apparatus of scalding carcasses by the use of water droplets directed toward the carcasses.

Other objects and advantages of the present invention will become more readily apparent from the following description of a preferred embodiment thereof.

DETAILED DESCRIPTION OF PREFERRED EMBODIMENT

Figure 1:
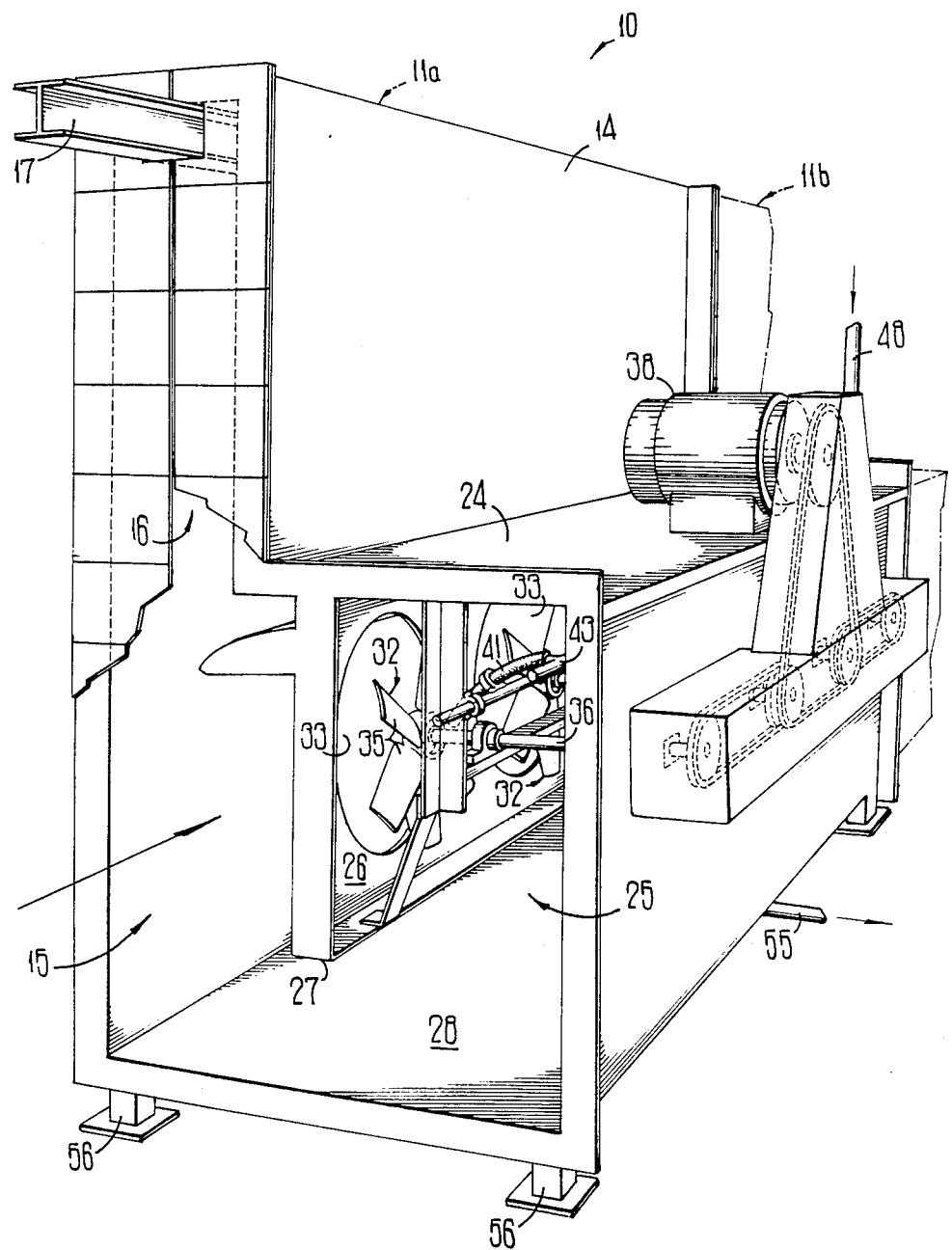
FIG. 1 is a pictorial view, partially broken-away for illustrative purposes, of a scalder according to a preferred embodiment of the present invention.

Turning first to FIG. 1, there is shown generally at 10 a scalding apparatus comprising a number of separate scalder sections 11a, 11b, . . . serially connected together. The number of such scalder sections utilized in a particular embodiment depends on variable factors including the desired scald time, the length of each scalder section, and the speed of the conveyor carrying birds through the scalding apparatus. In the following discussion only one scalder section 11a is described in detail, although those skilled in the art should understand that the following detailed description of that particular scalder sectional generally applies to all scalder sections making up the scalding apparatus 10. It will also become apparent to those skilled in the art that the present scalding apparatus also has utility as a bird chiller, as is discussed below in greater detail.

Figure 2:
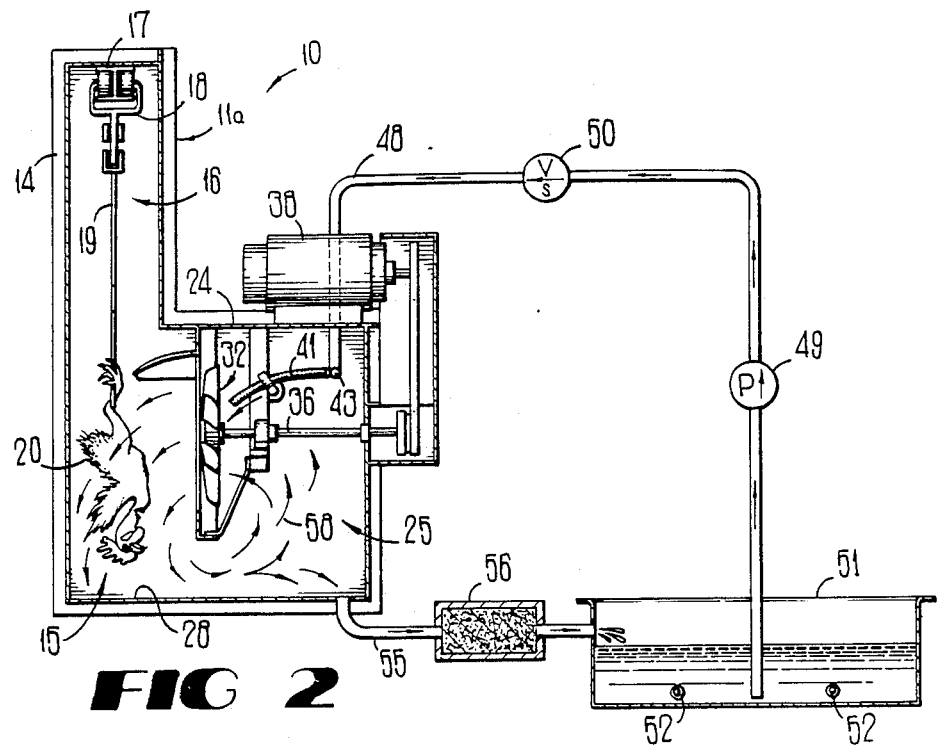
FIG. 2 is a lateral cross-section view of the scalder shown in FIG. 1.

The scalder section 11a includes a housing 14 defining a scald region 15 through which travel the birds including bird 20, and an upper region 16 directly above and open to communication with the scald region. Extending longitudinally through the housing 14 near the top of the upper region 16 is a length of track 17 forming part of the conventional overhead conveyor system typically found in poultry processing facilities. The track 17 supports a number of trolley assemblies 18 (FIG. 2) from which the shackles 19 hang downwardly to support birds 20 in an inverted position. The vertical extent of the upper region 16, in relation to the scald region 15, is selected so that the birds 20, when suspended from the shackles 19 moving along the conveyor track 17, move through the scald region as illustrated in FIG. 2.

Located at one side of the scald region 15 is an auxiliary housing 24 defining a fan chamber 25 partly separated from the scald region by the partition 26 extending longitudinally along the scalder section 11a. The lower edge 27 of the partition 26 is located well above the bottom 28 of the housing 14.

Figure 3:
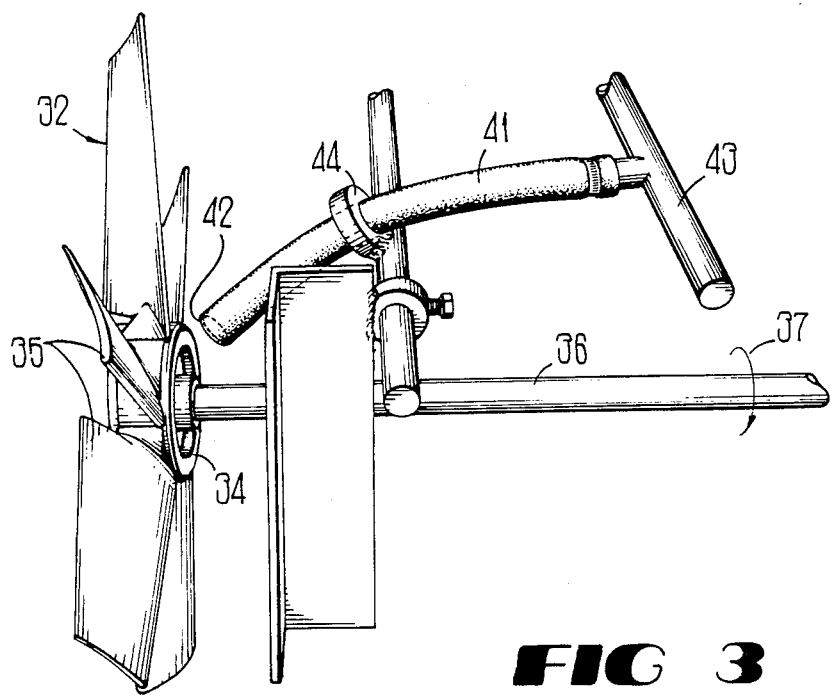
FIG. 3 is a detailed pictorial view of a typical fan hub and associated water supply pipe used in the disclosed embodiment.

Located within the fan chamber 25 are four fans 32, each fan being located adjacent an opening 33 in the partition 26 so as to blow a stream of air from the fan chamber into the scald region 15. As best seen in FIG. 3, each fan 32 includes a hub 34 supporting a number of radial blades 35 and mounted on a fan shaft 36 journalled on suitable bearings for rotation as indicated by the directional arrow 37. The scalder section 11a contains four such fans 32, as previously mentioned, and the shafts 36 for all four fans are ganged together for rotation in unison by the motor 38 mounted on the outside of the auxiliary housing 24.

A flow of water or other scalding liquid is supplied to each fan 32 through a hose 41 having an outlet end 42 is located immediately behind the hub 34 of the fan. One such water supply hose 41 is shown in FIG. 3, and it will be understood that corresponding hoses 41 are disposed behind the other fans 32 in the scalder section 11a. The hoses 41 are connected to a header pipe 43, and each hose is secured by a clamp 44 which maintains the outlet end 42 in position immediately behind the hub 34 of the fan. The outlet end 42 of each hose 41 preferably lacks any nozzle or other constriction which would increase the velocity of water exiting the outlet; water preferably flows from the outlet end of each hose at little or no back pressure.

Turning to FIG. 2, a water line 48 connects the header pipe 43 to the output of a water pump 49. A solenoid valve 50 preferably is included in the water line 48, to assure a positive shutoff of water when the scalder is not in use. The inlet side of the pump 49 is connected to a water tank 51, which also contains suitable heating elements such as the steam coil diagrammatically shown at 52. A water return line 55 extends from the bottom 28 of the housing 14 to the water tank 51. The entire housing assembly 14, 24 of the scalder section 11a is supported in elevation above the floor by the legs 56, FIG. 1, to an elevation which accommodates the conveyor track 17, preferably without need to lower the conveyor track from its normal path of travel throughout the processing plant. The bottom 28 of the scalder section 11a functions as a water collection trough as will become apparent, and the elevation of the scalder section above the floor may be sufficient to allow water to drain through the return line 55 to the water tank 51 without need of a scavenging pump. A water filter or strainer 56 optionally can be inserted in the return line 55 to prevent feathers or the like from entering the water tank 51.

The operation of the scalder as thus far described is now considered. The water tank 51 is initially filled with water and the water is heated to the desired scalding temperature, for example, about 127° F. The solenoid valve 50 then is opened and the water pump 49 operated, while the motor 37 is turned on to drive the fans 32 within the scalder. The fans establish a recirculating air flow within the scald region 15 and the fan chamber 25 as illustrated by the arrow 58 in FIG. 2, with the air flow from the fans being directed substantially perpendicular to the birds 20 travelling along a path through the scald region. The hot water flowing through the hoses 41 lands on the rotating hub 34 of each fan, and the water flows outwardly from centrifugal force to contact the fan blades 35. The fan blades rotating at a relatively high speed, e.g., approximately 2,700 RPM, strike the flowing water and atomize the water into small droplets, and these droplets are entrained by the air stream and thus are blow into the scald region 15 at a high rate of speed. These rapidly-moving water droplets thus intimately contact the exterior of each bird 20 conveyed through the scald region, and the air turbulence within the scald region ensures that all sides of the bird are subjected to the hot water droplets being blown into that region. The water droplets to some extent remain entrained in the air recirculating back to the inlet side of the fans 32, and thus are returned to the scald region. Some of the water in the scald region drains downwardly from the birds and the inner walls of the housing 14, and this water is collected by the bottom 28 which acts as a drain basin. The collected water is returned to the tank 51 by way of the drain line 15 where the water is reheated and returned by the pump 49 to the scalder section 11a.

It should now be apparent that the present scalder effectively subjects each bird to a continuing intimate contact with water maintained to the desired scalding temperature, without at any time dipping or immersing the bird in a water tank. No steam enters the scald region 15 or any other part of the housing 14, and so the uneven heating and temperature-control problem associated with steam scalders is avoided with the present scalder. Moreover, because atomization and forward movement of the water droplets is accomplished by flowing water onto the fans, instead of using nozzles or other conventional spray devices, the outlet end 42 of each hose 41 can operate under little or no exit pressure and thus is far less susceptible to becoming clogged with debris or the like. Furthermore, the relatively high velocity of the airborne water droplets enhances the heat-transfer effect of those droplets, and also increases the cleansing effect of the water on the birds.

Because the birds never are immersed in the water, contamination of the water from released fecal matter and other body fluids is less likely and so the present scalding apparatus may remain in operation for a longer time between required cleanings. The present scalding apparatus is easily cleaned by filling the tank 51 with soapy water and running the apparatus, creating a high-velocity recirculation of soapy droplets which effectively cleanses the interior of the scalding apparatus.

The scalding apparatus 10 as thus described becomes a chiller by the simple expedient of substituting chilled water for the hot water used for scalding. The airborne droplets of water recirculating around the birds significantly enhance the rate of heat transfer from the birds to the chilled water, thereby shortening the residency time within the chiller required to chill each bird.

It should be understood that the foregoing relates only to a preferred embodiment of the present invention, and that numerous changes and modifications therein may be made without departing from the spirit and scope of the appended claims.

What is claimed:

1. Apparatus for causing significant heat transfer relative to the carcasses of birds or the like, comprising:
   means defining an enclosed region on a path along which the carcasses are moved;
   means directing an air flow of relatively high velocity within the enclosed region in a direction toward the carcasses moving along the path; and
   means introducing a flow of water immediately upstream of the air flow means, such that the water flow impinges the air flow means and is fragmented into small droplets propelled toward the path to strike the carcasses at a substantial velocity, whereby heat transfer between the water droplets and the carcasses occurs without causing thermal damage to the surface of the carcasses.

2. Apparatus as in claim 1, wherein the water is hot water so that the carcasses are scalded to loosen the feathers without burning the skin of the carcasses.

3. Apparatus as in claim 1, wherein the water is chilled water so that the carcasses are chilled without drying the skin of the carcasses.

4. Apparatus as in claim 1, wherein:
   the air flow means comprises at least one fan having a hub mounted for rotation, and blades radially extending from the hub;
   motive means operative to rotate the hub; and
   the flow introducing means directs the flow of water onto the fan from behind the blades.

5. Apparatus as in claim 4, wherein:
   the flow introducing means comprises a conduit delivering a flow of water to the fan at relatively low pressure to minimize the amount of water passing between the fan blades without being impinged by the fan blades.

6. Apparatus as in claim 4, wherein:
   the flow introducing means is positioned to direct the flow of water onto the hub of the fan, so that rotation of the fan moves the water radially outwardly into contact with the fan blades,
   whereby the blades fragment the water into said droplets.

7. Apparatus for scalding fowl carcasses to enhance the removability of feathers, comprising:
   means defining an enclosed region along which the fowl move;
   a fan operative to direct a recirculating stream of air intersecting the fowl within the enclosed region;
   a reservoir for receiving a supply of liquid;
   means associated with the reservoir for heating the liquid therein to a predetermined temperature sufficient to accomplish scalding of the fowl when the heated liquid is applied thereto;
   a pump operative to withdraw heated liquid from the reservoir and introduce the liquid to the air stream so that the liquid becomes atomized and airborne in the air stream; and
   liquid return means collecting the liquid falling out from the air stream and returning the collected liquid to the reservoir,
   whereby airborne droplets of heated liquid are blown against the carcasses and heat the carcasses sufficiently to loosen the feathers.

8. Apparatus as in claim 7, further comprising:
   means introducing the heated liquid immediately upstream from the fan, so that the liquid strikes the fan and is thereby atomized and becomes airborne in the recirculating stream of air.

9. Apparatus as in claim 7, wherein the reservoir is located apart from the predetermined path along which the fowl move, so that the carcasses do not undergo immersion in the reservoir.

10. Apparatus as in claim 7, wherein the carcasses move on a conveyor line along the predetermined path, and wherein:
    the means defining the enclosed region comprises a housing enclosing a portion of the conveyor,
    the housing having an entrance opening and an exit opening through which the fowl enter and exit the housing; and
    closure means associated with the entrance and exit openings and permitting passage therethrough of the fowl on the conveyor while substantially preventing exit from the housing of the recirculating air stream and the airborne water droplets.

11. Apparatus as in claim 10, wherein:
    the liquid return means includes a trough located at a bottom portion of the housing and operative to collect liquid for return to the reservoir.

12. Method for causing heat transfer on the exterior of bird carcasses or the like moving along a path, comprising the steps of:
    defining an enclosure along a portion of the path, so that the birds pass through the enclosure;
    disposing at least one fan in air flow communication with a side of the enclosure, so as to direct a flow of air at a relatively high velocity toward the bird carcasses moving along the path; and
    introducing a flow of water at a nonambient temperature immediately upstream from the fan so that the water flow is fragmented by the fan into small droplets and the droplets become entrained in the air flow and are propelled toward the path to strike the carcasses at a substantial velocity,
    thereby causing heat transfer between the water droplets and the carcasses.

13. The method as in claim 12, further comprising:
    collecting the water droplets that precipitate from the air flow;
    removing particulate matter from the collected water; and then
    reintroducing the water upstream from the fan.

14. Method as in claim 13, further comprising recirculating the air within the enclosure.

* * * * *